(12) United States Patent
Higuchi et al.

(10) Patent No.: US 6,667,770 B1
(45) Date of Patent: Dec. 23, 2003

(54) ELECTRONIC IMAGE PICKUP APPARATUS

(75) Inventors: Tatsuji Higuchi, Akiruno (JP); Kenichi Aoki, Yokohama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/149,791

(22) Filed: Sep. 8, 1998

(30) Foreign Application Priority Data

Sep. 9, 1997 (JP) .............................................. 9-244377

(51) Int. Cl.[7] .............................................. H04N 5/235
(52) U.S. Cl. ................................... 348/362; 348/221.1
(58) Field of Search ............................... 348/362, 220, 348/221, 298, 220.1, 221.1, 224.1; 396/459, 460

(56) References Cited

U.S. PATENT DOCUMENTS

| | | | | |
|---|---|---|---|---|
| 3,595,152 A | * | 7/1971 | Douglas ..................... | 396/460 |
| 4,558,368 A | * | 12/1985 | Aoki et al. .............. | 348/221.1 |
| 4,689,689 A | * | 8/1987 | Saito et al. .............. | 348/221.1 |
| 4,734,777 A | * | 3/1988 | Okino et al. ............. | 348/221.1 |
| 4,860,108 A | * | 8/1989 | Saito et al. ................. | 348/298 |
| 4,972,269 A | * | 11/1990 | Fukushima et al. ...... | 348/221.1 |
| 5,978,602 A | * | 11/1999 | Toyofuku et al. ............. | 396/62 |
| 6,359,649 B1 | * | 3/2002 | Suzuki ....................... | 348/220 |

* cited by examiner

*Primary Examiner*—Aung S. Moe
(74) *Attorney, Agent, or Firm*—Volpe and Koenig, P.C.

(57) ABSTRACT

An electronic image pickup apparatus according to the present invention includes a holding barrel, a lens frame supported by guide shafts inside the holding barrel and slidable and moveable in a direction of an optical axis, a light beam adjusting unit including an aperture and/or shutter for mechanically adjusting a light beam passing through the lens frame, and an image pickup element for converting an object image passed through the light beam adjusting unit to an electrical signal. The light beam adjusting unit comprises a base plate arranged perpendicular to the optical axis inside the lens barrel, an aperture member and/or a shutter member attached to the base plate, and an aperture driver for driving the aperture member and/or a shutter driver for driving the shutter member, arranged on the base plate.

6 Claims, 4 Drawing Sheets

ELECTRONIC IMAGE PICKUP APPARATUS

BACKGROUND OF THE INVENTION

The present invention relates to an electronic image pickup apparatus, such as an electronic camera, comprising a light beam adjusting unit including an aperture and/or a shutter.

Exposure of an electronic image pickup apparatus, for example, a digital camera, is controlled by programmed exposure using the combination of an exposure and an aperture.

First, as regards the aperture type, a type in which common blades serve as both an aperture and a shutter is conventionally known as an aperture used in a silver salt film camera, or the like. In the case of an image pickup element, since it has a narrow latitude, exposure accuracy must be higher than in the case of silver salt film is required. However, an aperture of the conventional type having a plurality of aperture blades cannot precisely reproduce an aperture diameter. Under the circumstances, a so-called turret-type aperture, in which a suitable aperture plate having a fixed open diameter is inserted in the optical path, is employed.

Secondly, as regards the shutter type, an electronic shutter of an image pickup element is generally used, which is simple and does not require a mechanical system. However, with only an electronic shutter, the image pickup element is kept irradiated with light reflected by an object, even after the charge storage period expires. Therefore, noise charge is liable to be generated in a charge storage section, a charge transfer path or a surrounding portion before and after a photographing time. If the noise charge enters the charge transfer path, the quality of an image will be deteriorated. This is called smear noise.

The smear noise can be prevented, if a mechanical shutter for shielding the image pickup element from light reflected by an object is provided in the photographing optical system, so that the mechanical shutter is driven at substantially the same time as the completion of exposure to shield the image pickup element from external light.

Particularly, in an image pickup element having a number of pixels, the signal charge transfer time is long, resulting in higher probability of influence by smear, a mechanical shutter is required in addition to an electronic shutter. Thus, it is necessary to add the function of a mechanical shutter to an aperture of the turret type which can provide an accurate aperture. From this viewpoint, it is proposed to improve an aperture of, for example, the turret type, so as to also serve as a shutter by arranging a shielding section in proximity to the aperture opening of the turret aperture plate. This aperture shutter system is disclosed in Published Japanese Patent No. 2622296, etc. Further, Jpn. Pat. Appln. KOKAI Publication No. 7-111616 discloses a system in which an aperture and a shutter are driven by a single motor.

However, in the case where the turret type aperture also functions as a shutter, it is necessary to provide a relatively large shielding section in the aperture opening. For this reason, the diameter of the aperture plate as a whole is large, and resulting in the drawback of the large apparatus size. In both the aforementioned prior art references, although a single driver is used, it is required that the opening of the aperture section be positioned accurately and that the shutter section open and close the blades at a high speed. It is not necessarily easy to satisfy both requirements by means of the single driver as disclosed in the prior art references.

Further, in a portable apparatus using a battery, the supplied voltage may be lower than the voltage which allows photographing by a drop in source voltage, depending on the drive timing of the shutter and the aperture. In this case, a normal operation cannot be performed.

BRIEF SUMMARY OF THE INVENTION

An object of the present invention is to provide a electronic image pickup apparatus having an aperture shutter unit, which can be assembled easily and compact, and in which a battery lifetime is long and a stable operation is expected.

To achieve the above object, the electronic image pickup apparatus of the present invention has the following constitution. The features of the present invention other than the following will be clarified in the description of the embodiments.

The electronic image pickup apparatus of the present invention comprises: a holding barrel; a lens frame supported by guide shafts inside the holding barrel and slidable and movable in a direction of an optical axis; a light beam adjusting unit including an aperture and/or shutter for mechanically adjusting a light beam passing through the lens frame; and an image pickup element for converting an object image passed through the light beam adjusting unit to an electrical signal, the light beam adjusting unit comprising: a base plate arranged perpendicular to the optical axis inside the lens barrel; an aperture member and/or a shutter member attached to the base plate; and an aperture driver for driving the aperture member and/or a shutter driver for driving the shutter driver, arranged on the base plate.

DETAILED DESCRIPTION OF THE INVENTION

Embodiment

Figure 1:
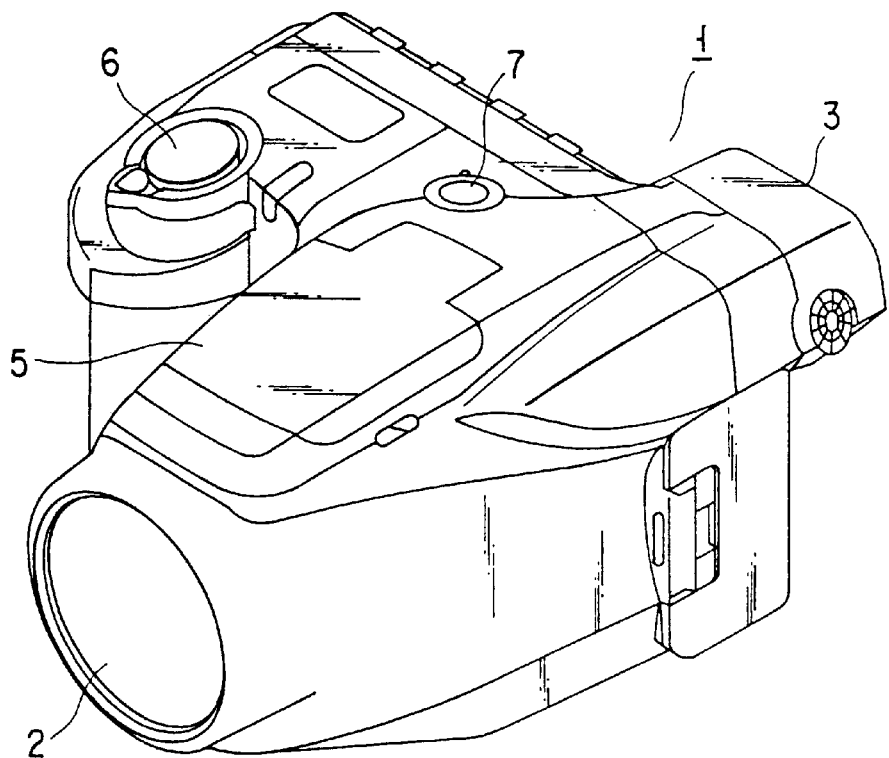
FIG. 1 is a front, perspective view of the outward appearance of an electronic image pickup apparatus according to an embodiment of the present invention.
Figure 2:
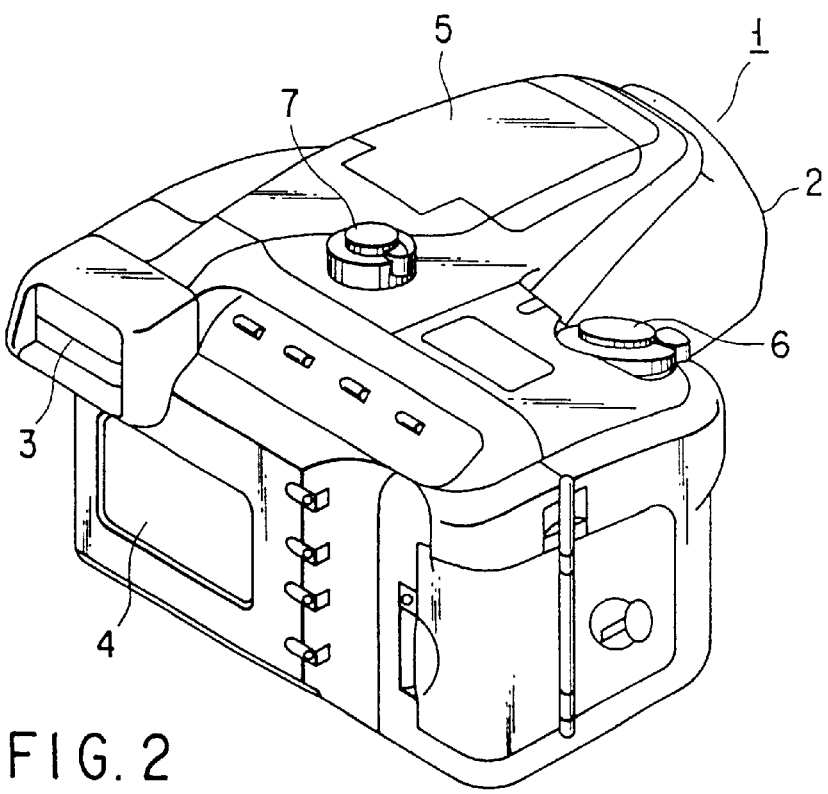
FIG. 2 is a back, perspective view of the outward appearance of the electronic image pickup apparatus according to the embodiment of the present invention.

In FIGS. 1 and 2, a reference numeral 1 indicates a camera body, i.e., a main body of an electronic image pickup apparatus; 2, an optical system (including optical components such as a zoom lens); 3, a finder; 4, a liquid crystal monitor display; 5, a stroboscope; 6, a release button; and 7, a power switch. Hereinafter, a lens barrel including the optical system 2, which is the main part of the present invention, will be described in detail.

Figure 3:
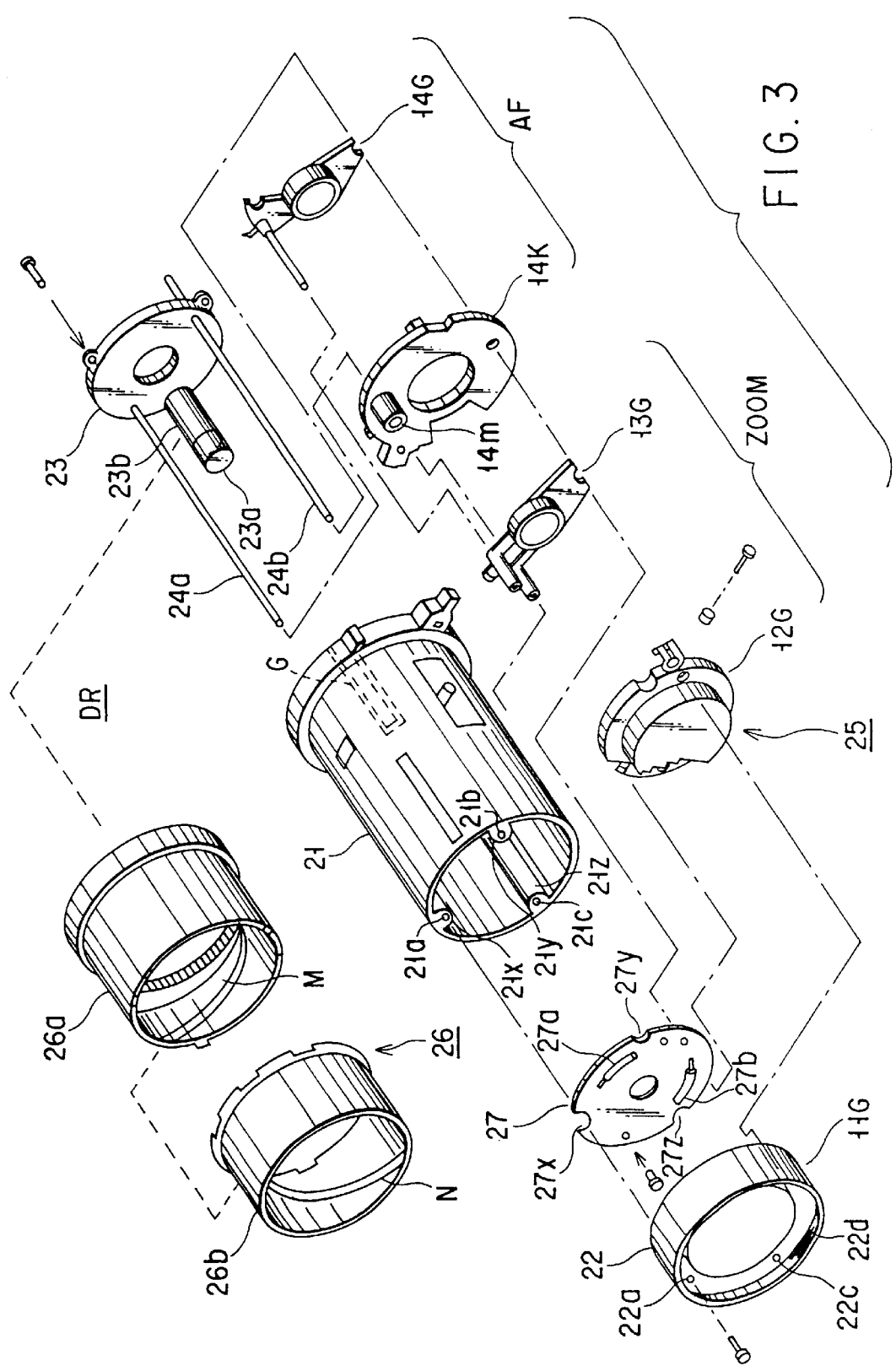
FIG. 3 is an exploded, perspective view of a lens barrel including an optical system built in the camera body of the electronic image pickup apparatus according to the embodiment of the present invention.

FIG. 3 is an exploded perspective view of a lens barrel unit including an optical system 2 built in the camera body 1. A cylindrical case shown in a central portion of FIG. 3 is a holding barrel 21, both ends of which are open. A front lens barrel 22 is fixed to the front open end of the holding barrel 21, which is shown on the left side of FIG. 3, by a fixing means such as a screw, while a mounting substrate 23 is fixed to the rear open end of the holding barrel 21, which is shown on the right side of FIG. 3, by the fixing means.

One end of each of paired guide shafts 24a and 24b is inserted into a hole of the mounting substrate 23 and adhesively fixed thereto, and the other end thereof is fitted and supported by the rim portion of the front lens barrel 22. These paired guide shafts 24a and 24b are arranged in the holding barrel 21 in parallel to the optical axis.

A moving lens frame group 25 (12G, 13G, 14G, etc.) is guided by the guide shafts 24a and 24b and moved slidably in the optical axis direction in the holding barrel 21. As will be clearly described later, the moving frame 14G moves along the guide shafts 24a and 24b, together with the moving lens frames 12G and 13G, while it is mounted on a moving frame 14K. For convenience of description, in this embodiment, an optical element with a lens is represented by "G" and that without a lens is represented by "K". The components 12G and 13G are used chiefly for zooming (ZOOM), and the components 14K and 14G are for autofocus (AF), though they are not necessarily differentiated definitely. The components 14K and 14G are driven so as to relatively brought close to and separated from each other by means of an AF motor 14m mounted on the moving frame 14K, thereby adjusting the focus automatically.

A plurality of ribs 21x, 21y and 21z (three ribs in this embodiment) are provided on the inner surface of the holding barrel 21 in parallel to the optical axis. These ribs 21x, 21y and 21z extend from the front open end to the inner portion thereof, which is beyond a light quantity adjusting unit 27 or an aperture shutter unit for adjusting a quantity of light passing therethrough. The ribs 21x, 21y and 21z therefore function as guide rails for the light quantity adjusting unit 27. The light quantity adjusting unit 27 is shaped like a disk and has notch portions 27x, 27y and 27z on its periphery. If the notched portions are engaged with the ribs 21x, 21y and 21z, respectively to slide the light quantity adjusting unit 27 using the ribs as a guide, the light quantity adjusting unit 27 can easily be inserted inwardly from the front open end of the holding barrel 21.

The ribs 21x, 21y and 21z are provided at one end with screw holes 21a, 21b and 21c for screwing the front lens barrel 22.

The front lens barrel 22 has mounting threads 22d formed on the inner surface thereof to detachably mount optical components, such as an adapter lens and a filter from outside. The front lens barrel 22 also has screw inserting holes 22a to 22c corresponding to the screw holes 21a to 21c of the ribs 21x, 21y and 21z.

A cam cylinder 26, for moving back and forth the moving lens frame group 25 in the optical axis direction, is fitted on the outer surface of the holding barrel 21 such that it can slidably contact and rotate thereon. The cam cylinder 26 includes a first cam cylinder 26a having a convex cam M on its inner surface and a second cam cylinder 26b having a concave cam N thereon which are coupled to each other. The cam cylinder 26 is rotated by power transmitted from a driving source, which is constituted of a zooming motor 23a and a reduction mechanism 23b fixed on the mounting substrate 23, by means of a power transmission mechanism.

The aperture shutter unit 27 is mechanically adjust a light beam transmitted through the moving lens frame group 25 supported by the guide shaft 24a and 24b and stored within the holding barrel 21.

Figure 4:
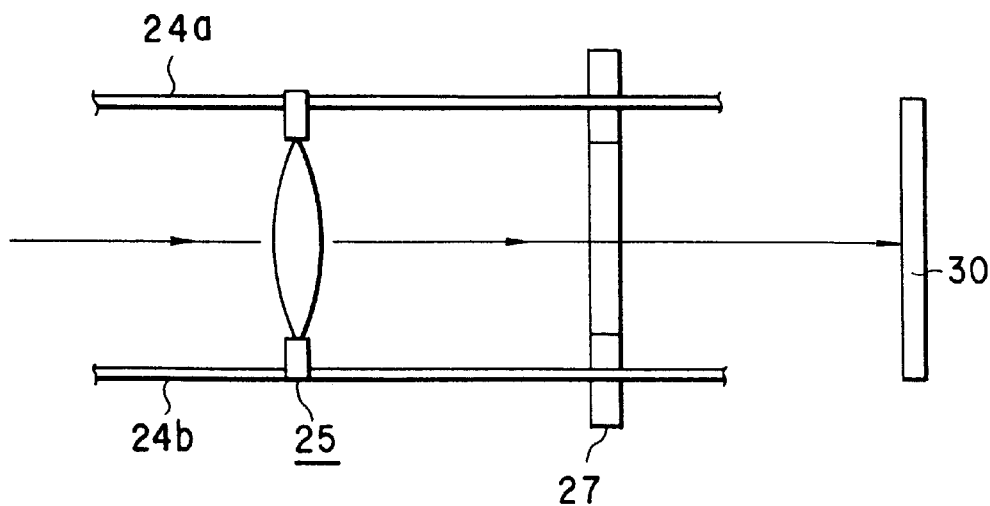
FIG. 4 is a diagram showing a schematic structure of an image pickup system of the electronic image pickup apparatus according to the embodiment of the present invention.

As shown in FIG. 4, a light beam transmitted through the moving lens frame group 25 and the aperture shutter unit 27, i.e., an image of an object, is formed on an image pickup element 30. The image of the object is converted to an electrical signal by the image pickup element 30 and output as an image signal.

Figure 5:
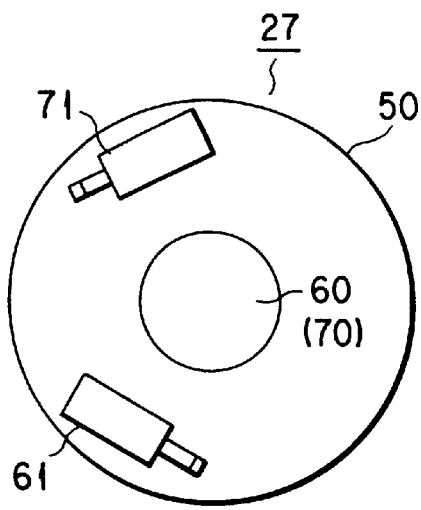
FIG. 5 is a diagram showing the front surface of an aperture shutter unit of the electronic image pickup apparatus according to the embodiment of the present invention.
Figure 6:
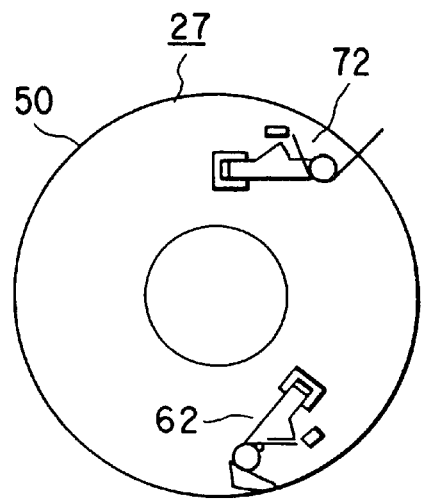
FIG. 6 is a diagram showing the rear surface of an aperture shutter unit of the electronic image pickup apparatus according to the embodiment of the present invention.

As shown in FIGS. 5 and 6, the aperture shutter unit 27 comprises a base plate 50 which is disk-shaped and arranged perpendicular to the optical axis within the holding barrel 21. It also comprises an aperture member 60 made of a thin plate having a circular opening and a shutter member 70 made of two thin plates. These members 60 and 70 are attached to the base plate 50. An aperture driver 61 and a shutter driver 71 are arranged, as shown in FIG. 5, so as to face each other on one surface of the base plate 50. Each of the aperture driver 61 and the shutter driver 71 uses a solenoid plunger mechanism.

As shown in FIG. 6, an aperture lever 62 for driving the aperture member 60 by means of the aperture driver 61 and a shutter lever 72 for driving the shutter member 70 by means of the shutter driver 71 are arranged on the other surface of the base plate 50. The aperture lever 62 and the shutter lever 72 have the same shape as shown in the drawing.

Operations of the respective portions will be described briefly. When power is not supplied to the aperture driver 61, the aperture member 60 is hidden in the base plate 50, and an opening provided in the central portion of the base plate and having an open diameter serves as a fixed aperture. When power is supplied to the aperture driver 61, the aperture lever 62, a part of which is engaged with an iron core of the solenoid plunger, is rotated, thereby rotating the aperture member 60 engaged with a part of the aperture lever 62 with a pin. As a result, a part of the optical path is shielded by the aperture member 60 having a small circular opening. Needless to say, the diameter of the circular opening of the aperture member 60 is smaller than the open diameter. When the power supply to the aperture driver 61 is ceased, the aperture member 60 is returned to the initial position by the action of a spring provided on the iron core of the solenoid plunger, with the result that the aperture is turned open.

When power is not supplied to the shutter driver 71, the two plates of the shutter member 70 are hidden in the base plate 50. When power is supplied, the shutter member 70 entirely shields the optical path by the rotating operation of the shutter lever 72. When the power supply is ceased, as in the case of the aperture member, the shutter member 70 is retracted inside the base plate 50.

Figure 7:
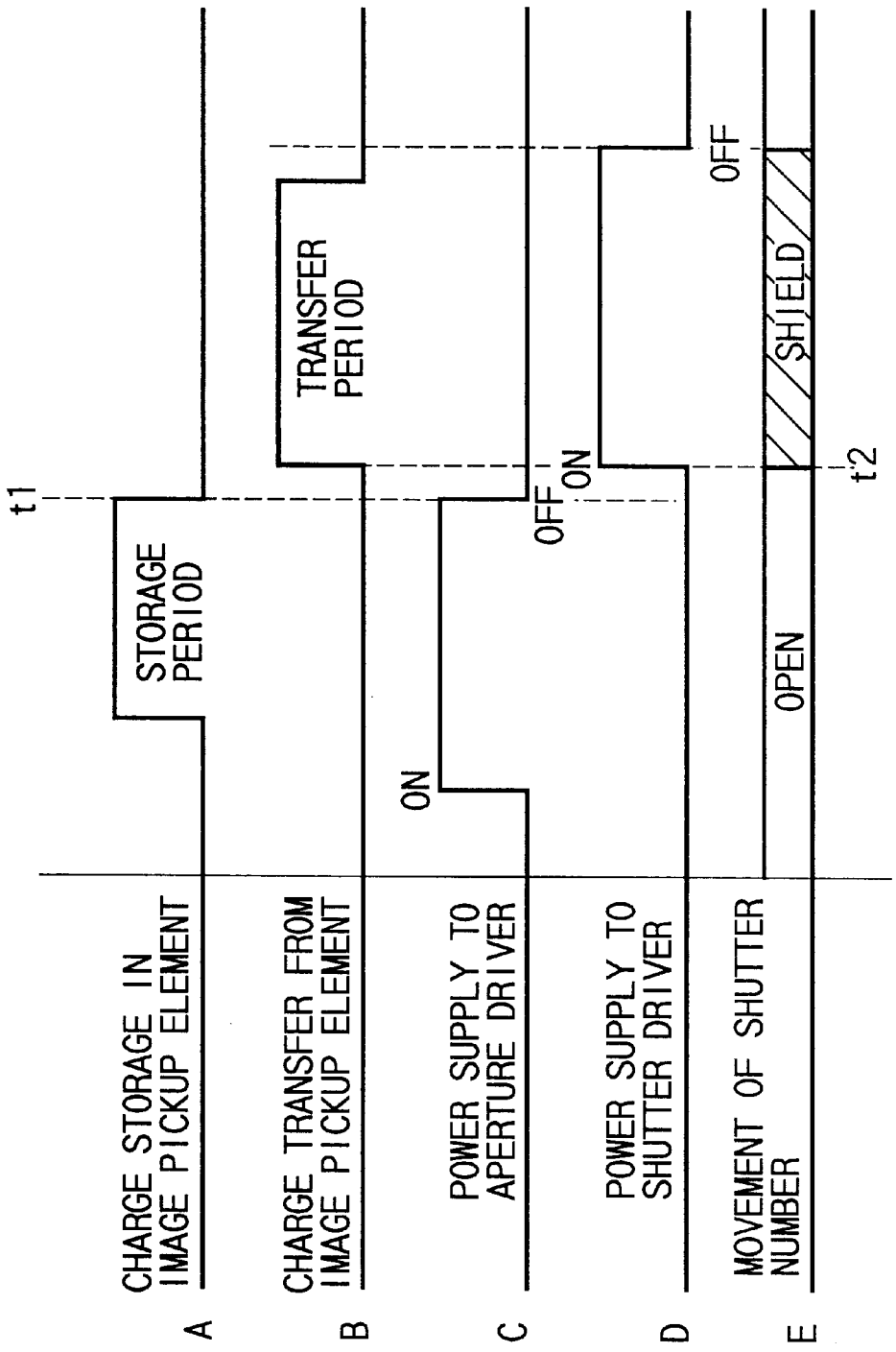
FIG. 7 is a diagram showing the relationship among a charge storage period, a charge transfer period and drive timings of the aperture and the shutter of the electronic image pickup apparatus according to the embodiment of the present invention.

FIG. 7 is a diagram showing the relationship among a charge storage period, a charge transfer period and drive timings of the aperture and the shutter of in the image pickup element 30. As shown in the chart D and E in FIG. 7, the shutter member 70 performs a shield operation when the shutter driver 71 is provided with power, so that the image pickup element 30 can be shielded from a light beam. As shown in the chart C and D in FIG. 7, as regards the timing of power supply to the shutter driver 71, the operation timing is preset so as to start at a time t2, the same time as or later than the cutoff of the power supply to the aperture driver 61.

Features of the Embodiment

[1] An electronic image pickup apparatus according to the embodiment comprises a cylindrical holding barrel 21, a lens frame 25 supported by guide shafts 24a and 24b inside the holding barrel 21 and slidable and movable in a direction of an optical axis, an aperture shutter unit 27 including an aperture and a shutter for mechanically adjusting a light beam passing through the lens frame 25, and an image pickup element 30 for converting an object image passed through the aperture shutter unit 27 to an electrical signal.

The aperture shutter unit 27 comprises a base plate 50 which is disk-shaped and arranged perpendicu-lar to the optical axis inside the lens barrel, an aperture member 60 and a shutter member 70 attached to the base plate 50, and an aperture driver 61 for driving the aperture member 60 and a shutter driver 71 for driving the shutter member 70, arranged on the same surface of the base plate 50 so as to face each other.

In this electronic image pickup apparatus, the shutter member 70 and the shutter driver 71 are independently provided, a switch timing optimal for the shutter can be set relatively easily. In addition, since the aperture and the shutter are combined as a unit and the drivers 61 and 71 are arranged on the same surface of the base plate 50 so as to face each other, the operability in an assembly process is satisfactory. Moreover, since the aperture shutter unit 27 is provided as a single unit, it can be handled easily, and efficiently assembled into the apparatus. Thus, the space within the apparatus can be used effectively, which reduces the size of the electronic image pickup apparatus.

[2] In the electronic image pickup apparatus according to the embodiment as described in above item

[1], each of the aperture driver 61 and the shutter driver 71 comprises a solenoid plunger mechanism.

In this electronic image pickup apparatus, since solenoid plunger mechanisms are used as the drivers 61 and 71, the operation speed is high. Moreover, since the transmission system is simple, a small number of parts is required.

[3] In the electronic image pickup apparatus according to the embodiment as described in above item

[2], an aperture lever 62 for driving the aperture member 60 with the driving force of the aperture driver 61 and a shutter lever 72 for driving the shutter member 70 with the driving force of the driver 71 have the same shape.

In this electronic image pickup apparatus, the parts are provided for common use and arranged in relation to each other. Therefore, the apparatus is assembled efficiently and manufactured easily, resulting in reduction in costs.

[4] In the electronic image pickup apparatus according to the embodiment as described in above item [2], the shutter is set to perform a shielding operation to shield the image pickup element 30 from a light beam, when power is supplied to the shutter driver 71, and an operation timing of the shutter driver 71 is set so that power supply is started at the same time as or later than cutoff of the power supply to the aperture driver 61 when a charge storage operation of the image pickup element 30 is completed.

The above electronic image pickup apparatus has the following effects and advantages. Even if the charge storage period of the image pickup element 30 is controlled by the electronic shutter function, if light is incident on the image pickup element 30 in a discharge period, so-called smear may occur. To prevent the smear, it is only necessary to shield the image pickup element 30 from light beam by operating a mechanical shutter, after the exposure of the image pickup element 30 is completed. However, when the aperture driving solenoid plunger mechanism 61 and the shutter driving solenoid plunger mechanism 71 are driven at the same time, the source voltage drastically drops in a short period of time. If the source voltage drops under a predetermined voltage even in a short period of time, the apparatus will be down. Thus, since the simultaneous driving of the aperture driving solenoid plunger mechanism 61 and the shutter driving solenoid plunger mechanism 71 causes a big fall of the source voltage, it is a main factor of reduction of the lifetime of the battery in a battery-incorporated portable device such as a digital camera.

Since the aperture control is unnecessary after completion of a charge storage operation, in the apparatus of the present invention, power is supplied to the shutter driver 71 to drive it, after the power supply to the aperture driver 61 is ceased. As a result, simultaneous power supply to the two solenoid plunger mechanisms 61 and 71 is avoided, so that instantaneous reduction of the potential is prevented. As a result, the lifetime of the battery is prolonged. Therefore, the present invention is particularly effective for a portable digital camera, etc.

What is claimed is:

1. An electronic image pickup apparatus comprising:

a holding barrel;

a guide shaft inside the holding barrel and parallel to a center axis of the holding barrel;

a movable lens frame group guided by the guide shaft and movable in a direction of an optical axis in the holding barrel;

a light beam adjusting unit for mechanically adjusting a light beam passing through the movable lens frame group;

an image pickup element of charge-storage type to convert an object image passed through the light beam adjusting unit to an electrical signal; and said light beam adjusting unit including:

a base plate arranged perpendicular to the optical axis inside the holding barrel;

an aperture driver and a shutter driver located on the base plate;

an aperture member located on the base plate and driven by the aperture driver to perform a lens stopping operation when current is supplied to the aperture driver, thereby restricting a light beam incident on the image pickup element;

a shutter member located on the base plate and driven by the shutter driver to perform a shielding operation to shield the image pickup element from the light beam; and current supply control means for controlling current supply to start current supply to the shutter driver causing the shutter to close when a charge transfer operation of the image pickup element is started, after current supply to the aperture driver is cut off when a charge storage operation of the image pickup element is completed.

2. The electronic image pickup apparatus according to claim 1, wherein each of the aperture driver and the shutter driver comprises a solenoid plunger mechanism.

3. The electronic image pickup apparatus according to claim 2, further comprising an aperture lever to drive the aperture member with driving force of the aperture driver and a shutter lever to drive the shutter member with driving force of the shutter driver, the aperture lever and the shutter lever having the same shape and located on the base plate.

4. An electronic image pickup apparatus comprising:

a lens assembly having an optical axis;

a light beam adjusting unit for mechanically adjusting a light beam passing through the lens assembly;

an image pickup element of charge-storage type to convert an object image passed through the light beam adjusting unit to an electrical signal; and said light beam adjusting unit including:

a base plate arranged perpendicular to the optical axis;

an aperture driver and a shutter driver located on the base plate;

an aperture member located on the base plate and driven by the aperture driver to perform a lens stopping operation when current is supplied to the aperture driver, thereby restricting a light beam incident on the image pickup element;

a shutter member located on the base plate and driven by the shutter driver to perform a shielding operation to shield the image pickup element from the light beam; and current supply control means for controlling current supply to start current supply to the shutter driver causing the shutter to close when a charge transfer operation of the image pickup element is started, after current supply to the aperture driver is cut off when a charge storage operation of the image pickup element is completed.

5. The electronic image pickup apparatus according to claim 4, wherein each of the aperture driver and the shutter driver comprises a solenoid plunger mechanism.

6. The electronic image pickup apparatus according to claim 4, further comprising an aperture lever to drive the aperture member with driving force of the aperture driver and a shutter lever to drive the shutter member with driving force of the shutter driver, the aperture lever and the shutter lever having the same shape and located on the base plate.

* * * * *